Figure 1:
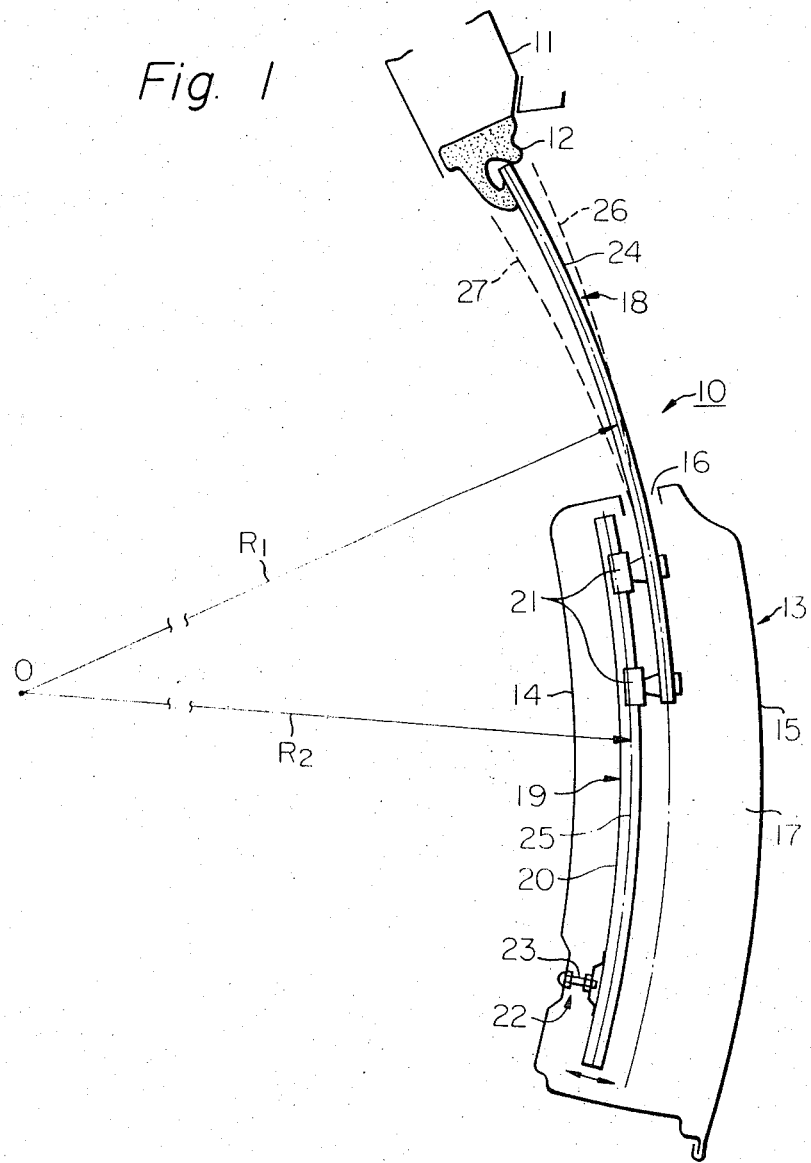

United States Patent [19]

Yamaha et al.

[11] 3,844,064
[45] Oct. 29, 1974

[54] GUIDING MECHANISM FOR SLIDING WINDOWS OF AUTOMOTIVE VEHICLES

[75] Inventors: Kazuo Yamaha; Yasumasa Okada, both of Tokyo, Japan

[73] Assignee: Nissan Motor Company, Limited, Yokohama, Japan

[22] Filed: Aug. 7, 1973

[21] Appl. No.: 386,400

Related U.S. Application Data

[63] Continuation-in-part of Ser. No. 220,165, Jan. 24, 1972, abandoned.

[30] Foreign Application Priority Data

Feb. 5, 1971   Japan.................................. 46-4605

[52] U.S. Cl..................... 49/348, 49/227, 49/375
[51] Int. Cl........................... E05f 11/38, B60j 1/16
[58] Field of Search.......... 49/40, 41, 227, 375, 348

[56] References Cited
UNITED STATES PATENTS

| | | | |
|---|---|---|---|
| 2,844,405 | 7/1958 | Roethel............................... | 49/375 |
| 3,413,760 | 12/1968 | Gorys et al. .......................... | 49/227 |
| 3,591,982 | 7/1971 | Nantau................................. | 49/227 |

*Primary Examiner*—J. Karl Bell

[57] ABSTRACT

A guiding mechanism for slidable curved window panes of automotive vehicles, comprising a curved, relatively elongated guide rail having one end pivotally fixed in the upper portion of the vehicle door body and the other end adjustably positioned in the lower portion of the vehicle door body, at least two sliding rollers mounted on the window pane and slidably engaged with the guide rail, and adjusting means for adjusting the lower portion of the guide rail with respect to the door inner panel. The guide rail is positioned in the vehicle door body in spaced substantially parallel relationship with respect to an arcuate path crossing uppermost and lowermost points between which the window pane is lowered and raised. The guide rail has a radius of curvature greater than that of the window pane but smaller than that of the arcuate path and has a center point of curvature concentric with that of the arcuate path, which center point is offset from that of the window pane.

2 Claims, 2 Drawing Figures

GUIDING MECHANISM FOR SLIDING WINDOWS OF AUTOMOTIVE VEHICLES

This invention is a continuation-in-part of application of Ser. No. 220,165 filed on Jan. 24, 1972 and now abandoned.

This invention relates in general to window sliding mechanisms for window panes of automotive vehicles and, more particularly, to a guiding mechanism for a slidable curved window pane of the automotive vehicles.

Automotive vehicles usually include window panes which are designed to be raised and lowered, as desired, relative to the vehicle body structure and it is usually also required that the supporting and guiding mechanism is hidden between vehicle door body panels. The necessary supporting, guiding and regulating mechanism becomes increasingly complex with window panes which have vertical or compound curvature.

Aside from the problem of stable support in the course of raising and lowering a window pane, as well as in the terminal disposition thereof, each window pane must be carefully manipulated by a suitable guiding and regulating mechanism to pass readily through a vehicle body or door opening of minimum width. Ideally, this opening should be no wider than the thickness of the window pane, with but modest clearance. This becomes extremely difficult especially when the window pane has a compound or vertical curvature and the housing space into which the window pane is lowered must be held to a minimum thickness.

It is, therefore, an object of the present invention to provide an improved guiding mechanism for slidable curved window panes of automotive vehicles which mechanism is simplified in construction, involves a minimum number of component parts and therefore the manufacturing cost is low.

Another object of the present invention is to provide a guiding mechanism especially suited for use with window panes having a desired curvature.

A further object of the present invention is to provide a guiding mechanism for manipulating a curved window pane through a relatively narrow window pane passageway which may use conventional weather strips.

A still further object of the present invention is to provide a guiding mechanism which is capable of easily guiding a curved window pane in the course of vertical movements without the use of complicated tracks and guideways.

A still further object of the present invention is to provide a guiding mechanism which assures a stability of a window pane in the course of movements and in its upper terminal position with the use of a unique arrangmeent so that the spacing therefor is minimized to decrease the thickness of the vehicle door body for thereby increasing the space in the passenger compartment without increasing the outside width of the vehicle.

In order to ahcieve these objects, the present invention features the provision of a guiding mechanism adapted for guiding a slidable curved window pane during raising and lowering thereof through a vehicle door body which has an opening through which the window pane passes, and inner and outer panels. The window pane is designed to have a predetermined desired radius of curvature. In a preferred embodiment of the present invention, the window guiding mechanism is comprised or a curved, relatively elongated and substantially vertical guide rail having one end pivotally fixed in the upper portion of the vehicle door body and the other end adjustably positioned in the lower portion of the vehicle door body. The guiding mechanism is also comprised of at least two sliding rollers mounted on the window pane. The sliding rollers are slidably engaged with a sliding surface of the guide rail for thereby guiding the window pane during raising and lowering thereof. The guide rail is positioned in the vehicle door body having its sliding surface in substantially parallel relationship with respect to an arcuate path having a radius which is greater than that of the window pane. The curvature of this sliding surface of the guide rail has a center point concentric with that of the arcuate path and has a radius of curvature which is smaller than that of the arcuate path. The guide rail is arranged in the vehicle door body to have the center point of the curvature of its sliding surface offset from that of the window pane so that the arcuate path is appropriate for the curved window pane to travel in.

Figure 2:
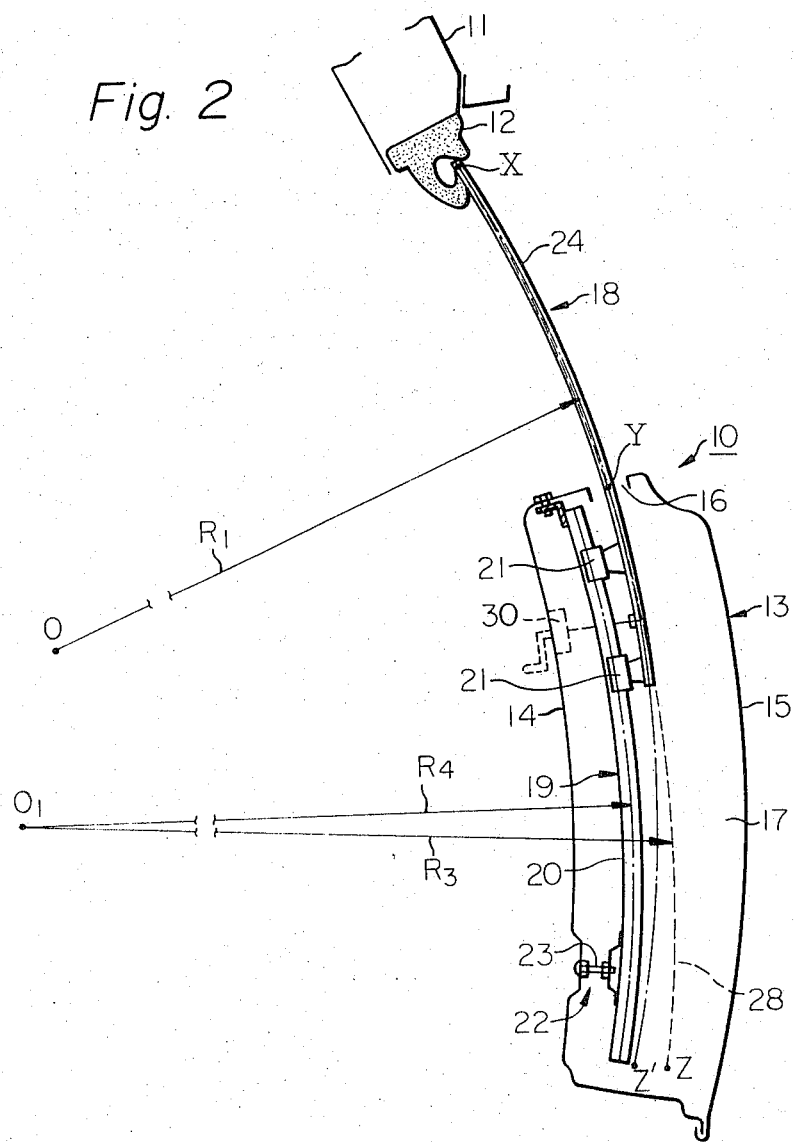

These and other objects and advantages of the present invention will become more apparent from the following description when taken in conjunction with the accompanying drawings, in which:

FIG. 1 is a fragmentary cross-sectional view of a vehicle body construction employing a conventional guiding mechanisms for a sliding curved window pane; and FIG. 2 is a fragmentary cross sectional view of a vehicle body construction incorporating a window guiding mechanism according to the present invention.

Referring now to FIG. 1, there is schematically shown in section a conventional guiding mechanism for the window pane. The vehicle body construction, generally indicated at 10, is shown to include a folding top 11 having thereon a weather seal strip 12 which forms a part of the folding top 11. The vehicle body construction 10 also consists of a door body 13 having inner and outer panels 14 and 15 which are joined in any known manner, such as rivetting or, bolting, welding or the like. The door body 13 has formed therein an opening 16 having a suitable weather seal strip (not shown) on opposite sides thereof and a space in which a guiding mechanism is mounted for guiding a sliding curved window pane 18.

The window pane guiding mechanism, generally designated at 19, is comprised of a curved, relatively elongated guide rail 20 having one end pivotally fixed in the upper portion of the door body 13 and the other end adjustably positioned in the lower portion of the door body 13. The guiding mechanism 19 is also comprised of at least two sliding rollers 21 which are mounted on the window pane at a given distance from the window pane 18 in such a fashion as to be vertically spaced from each other. As shown, the sliding rollers 21 are engaged with a sliding surface (no numeral) of the guide rail 20 for guiding the window pane 18 during raising and lowering thereof. An adjusting means 22 is provided between the inner panel 14 of the door body 13 and the guide rail 20 for effecting adjustable positioning of the guide rail 20 in relation to the inner and outer panels 14 and 15. The adjusting means 22 is herein shown as comprised of an adjusting screw 23 but may be of any suitable construction.

In prior practice, the window pane 18 is so designed as to form an arc of a circle 24, designated in phantom line in FIG. 1, of a predetermined radius $R_1$ of curvature whose center point is indicated at 0. On the other hand, the guide rail 20 is designed to have its sliding surface to form an arc of a circle 25, indicated in phantom line, of a radius $R_2$ of curvature which is smaller than that of the window pane 18 and whose center point is aligned with the center point 0 of the curvature of the curved window pane 18. It will be noted in this instance that the window pane 18 is caused to be raised and lowered along a travelling path which approximately follows the circular line 24.

With this construction, it is quite difficult to accurately assemble the guiding mechanism in such a manner as to provide a smooth travelling of the window pane 18 through the opening 16 of the door body 13 because of manufacturing tolerances. Consequently, it is frequently necessary to adjust the lower portion of the guide rail 20 by manipulating the adjusting screw 23 in either direction as shown by an arrow in FIF. 1 thereby to vary the travelling path of the window pane 18 as indicated by dotted lines 26 and 27. Since, as previously mentioned, the guide rail 19 has a smaller radius of curvature than that of the window pane 18, a lower portion of the window pane 18 approaches the door inner panel 14 when the window pane 18 is lowered and, therefore, the thickness of the door body should be increased to permit greater adjustment by the adjusting screw 23 so that the passenger compartment is accordingly decreased.

To alleviate these drawbacks, the present invention contemplates to provide a travelling path for the curved window pane 18 which path is formed by an arc of a circle following an uppermost point X in the weather seal strip 12 on the folding top 11, an entrance point Y at the opening 16 and a lowermost point Z closest to the door outer panel 15 of the vehicle door body 13. The travelling path, which is shown by a broken line 28, is designed to have a radius $R_3$ of curvature greater than that of the window pane 18. This travelling path 28 has a center point $O_1$ offset from the center point O of the window pane 18. The guide rail 19 is arranged to have a center point of the curvature of the sliding surface concentric with the center point $O_1$ of the arcuate path 28 and to have a radius $R_4$ of curvature greater than that of the window pane 18 but smaller than that of the arcuate path 28 so that the arcuate path 28 is substantially parallel to guide rail 19.

Indicated by reference numeral 30 are operating means operatively connected to the window pane 18 for raising and lowering the same. The operating means may be of any known construction such as disclosed in, for example, U.S. Pat. No. 3,281,991 entitled "Operating mechanism for retractable vehicle windows."

With the arrangement mentioned hereinabove, when the window pane 18 is raised by the operating means 30, the window pane 18 follows the arcuate path 28 between the points Y and X and tightly fits the abutment of the weather seal strip 12 of the folding top 11. When, on the contrary, the window pane 18 is lowered, the window pane 18 follows the arcuate path 28 between the points Y and Z and the window pane 18 is caused to rest near the outer panel 15 of the door body 13 in its lowermost position. It will readily be understood that, even when the window pane 18 is caused to slightly laterally move at the opening 16 during its upward and downward travels, this slight movement is absorbed by the elasticity of the weather seal strips mounted on opposite sides of the opening 16.

It will now be appreciated that the guiding mechanism for the curved window pane implementing the present invention is capable of reducing the thickness of the door body due to a unique arrangement and the use of minimum number of simple component parts with a resultant increase in size of the passenger compartment of the automotive vehicle.

What is claimed is:

1. A guiding mechanism for guiding a slidable curved window pane during raising and lowering thereof between uppermost and lowermost points through an opening formed in a vehicle door body having inner and outer panels, which window pane has a predetermined radius of curvature, said mechanism comprising, in combination, a curved, elongated guide rail having one end pivotally fixed in the upper portion of the vehicle door body and the other end adjustably positioned in the lower portion of the vehicle door body, at least two sliding rollers mounted on said window pane and slidably engaged with said guide rail for guiding said curved window pane during raising and lowering thereof, and adjusting means provided between the inner panel of said door body and said other end of said guide rail for effecting adjustable positioning of said other end of said guide rail in relation to said inner and outer panels, the curvature of a sliding surface of said guide rail having a center point concentric with a center point of an arcuate path crossing said uppermost and lowermost points and having a radius of curvature smaller than that of said arcuate path but greater than that of said window pane, and said center point of said curvature of the sliding surface of said guide rail being offset from the center point of said window pane.

2. A guiding mechanism for a slidable curved window pane of an automotive vehicle having a folding top on which a weather seal strip is mounted, a door body having an opening and inner and outer panels, said guiding mechanism comprising, in combination, a curved, elongated guide rail having one end pivotally fixed in the upper portion of said door body and the other end adjustably positioned in the lower portion of said door body, at least two sliding rollers mounted on said curved window pane and slidably engages with said guide rail for guiding said curved window pane on said guide rail during raising and lowering thereof through an uppermost point on said folding top, an entrance point at said door body opening and a lowermost point in said door body, and adjusting means located between said inner panel of said door body and said other end of said guide rail for adjusting the position of said other end of said guide rail in relation to said inner and outer panels, said guide rail being positioned in said door body in spaced parallel relationship with respect to an arcuate path crossing said uppermost, entrance and lowermost points and having a radius of curvature greater than that of said window pane but smaller than that of said arcuate path, and the curvature of said guide rail having a center point concentric with that of said arcuate path but offset from the center point of curvature of said window pane, whereby a single travelling path is provided between said uppermost point and said lowermost point on said arcuate path.

* * * * *